(12) United States Patent
Gillet et al.

(10) Patent No.: US 8,091,699 B2
(45) Date of Patent: Jan. 10, 2012

(54) DEVICE FOR LOADING CONTAINERS ON A TRANSPORTING ELEMENT PROVIDED WITH MEANS FOR EJECTING INCORRECTLY LOADED CONTAINERS

(75) Inventors: Denis Gillet, Octeville sur Mer (FR); Thierry Deau, Octeville sur Mer (FR); Yvan Benich, Octeville sur Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 225 days.

(21) Appl. No.: 12/063,032

(22) PCT Filed: Aug. 22, 2006

(86) PCT No.: PCT/EP2006/065550
§ 371 (c)(1),
(2), (4) Date: Apr. 12, 2010

(87) PCT Pub. No.: WO2007/025908
PCT Pub. Date: Mar. 8, 2007

(65) Prior Publication Data
US 2010/0200362 A1    Aug. 12, 2010

(30) Foreign Application Priority Data
Aug. 29, 2005  (FR) ...................................... 05 52589

(51) Int. Cl.
*B29C 49/64* (2006.01)
(52) U.S. Cl. ................. 198/605; 198/377.07; 198/459.2; 198/465.4; 198/478.1
(58) Field of Classification Search ............. 198/377.07–377.09, 449, 450, 198/459.2, 465.4, 469.1, 478.1, 605, 678.1; 209/522, 523, 524, 528
See application file for complete search history.

(56) References Cited

U.S. PATENT DOCUMENTS

| 3,432,033 A * | 3/1969 | Everett .......................... 209/560 |
| 3,637,074 A | 1/1972 | Banyas et al. |
| 3,863,753 A * | 2/1975 | Shank, Jr. ..................... 198/680 |
| 3,944,058 A * | 3/1976 | Strauss ..................... 198/377.07 |
| 4,506,780 A * | 3/1985 | Novak et al. ................ 198/468.6 |
| 4,625,854 A * | 12/1986 | Deichmann et al. .......... 198/416 |
| 5,558,200 A * | 9/1996 | Whitby et al. ............. 198/470.1 |
| 6,258,313 B1 | 7/2001 | Gottlieb |
| 6,488,449 B1 * | 12/2002 | Laquay et al. .................. 406/88 |
| 6,758,907 B2 * | 7/2004 | Kampmann ................... 118/503 |

(Continued)

FOREIGN PATENT DOCUMENTS

FR    2 864 051 A    6/2005

(Continued)

*Primary Examiner* — Douglas Hess
(74) *Attorney, Agent, or Firm* — Young & Thompson

(57) ABSTRACT

A device (10) for loading containers (12), which are provided with a neck (20), on an transporting element (14) includes a member (28) for individually grasping the container by the neck thereof, wherein the grasping member is used for catching or releasing the neck of a preform by the vertical slide of the preform with respect to the grasping member during an operation for catching or releasing it, the loading device includes elements (42, 68) for selectively ejecting the container from the transporting element during the releasing operation. The elements for ejecting the container are provided with container receiving members (42) which are used for catching the container prior to the releasing operation and are mounted in a horizontally movable manner in such a way that the trajectory of the receiving members are vertically superimposed and synchronized with the trajectory of the grasping device.

19 Claims, 3 Drawing Sheets

U.S. PATENT DOCUMENTS

| | | | |
|---|---|---|---|
| 7,451,868 B2 * | 11/2008 | Legallais et al. | 198/470.1 |
| 7,681,713 B2 * | 3/2010 | Nishi et al. | 198/470.1 |
| 7,743,907 B2 * | 6/2010 | Weinbrenner et al. | 198/459.2 |
| 7,849,996 B2 * | 12/2010 | Leblond et al. | 198/605 |
| 7,849,998 B2 * | 12/2010 | Langlois et al. | 198/803.9 |

FOREIGN PATENT DOCUMENTS

| | | |
|---|---|---|
| JP | 2004-276372 A | 10/2004 |
| JP | 2004-299350 A | 10/2004 |
| WO | 2006/010141 A2 | 1/2006 |

* cited by examiner

DEVICE FOR LOADING CONTAINERS ON A TRANSPORTING ELEMENT PROVIDED WITH MEANS FOR EJECTING INCORRECTLY LOADED CONTAINERS

BACKGROUND OF THE INVENTION

The invention relates to a device for loading containers that include a neck onto a transporting element.

The invention relates more particularly to a device for loading containers with a vertical axis comprising an upper neck, and in particular preforms made of thermoplastic material, onto a transporting element which comprises at least one individual member for grasping a container by its neck and which is able to transport the preform along a horizontal transport path, of the type in which the grasping member is able to catch or release the neck of the preform by vertically sliding the preform into a grasping position relative to the grasping member in an operation for grasping or releasing the preform, the loading device comprising means for selectively ejecting the container from the transporting element, when the container is incorrectly held by the individual grasping member after the grasping operation, in a releasing operation.

The present invention relates to refinements made to devices for loading containers or preforms having a neck, notably bottles, onto a transporting element which is equipped with individual members for grasping containers by their neck. These grasping members are spaced apart from each other by a predetermined pitch and the containers are brought to the loading device one after the other spaced apart by the predetermined pitch.

These loading devices are in particular suited to container production and/or filling installations. Thus, in container production installations, preforms are transported by such a transporting element through a preheating oven before the duly heated preforms are transformed into containers by a blow-molding operation.

In this type of installation, it happens that containers, and in particular preforms, are incorrectly held or caught by the grasping member of the transporting element. The preform then risks falling from the transporting element during its travel.

To avoid this problem, it is known that the incorrectly held preforms must be ejected at the start of the travel in order for the preforms not to fall in places that can threaten the operation of the installation, for example inside an oven.

However, in the known installations, the preforms are ejected with little precision, which entails providing a fairly wide ejected-preform recovery area.

SUMMARY OF THE INVENTION

To solve this problem, the invention proposes a loading device which comprises means for ejecting incorrectly held preforms that make it possible to eject the preforms more accurately, and which is characterized in that the means for ejecting the container comprise means of receiving the container which are able to catch the container prior to the releasing operation and which are mounted to move horizontally so that the path of the reception means is vertically superimposed and synchronized with the path of the grasping member.

According to other characteristics of the invention:
the ejection means comprise means for controlling the expulsion of the container from the reception means after the releasing operation;

the reception means comprise a clamp which is able to catch the container by its neck by reversible elastic fitting of the preform in the clamp;

the device comprises an obstacle which is positioned on the path of the lower body of the container carried by the clamp downstream of the operation for releasing the container, so that the container is stopped in its path by the obstacle while the clamp continues its path, causing the preform to be separated from the clamp;

the reception means are mounted to slide vertically relative to the grasping member between a top position in which the container carried by the clamp is held by the grasping member, and a bottom position in which the container is released from the grasping member, the device comprising means for selectively sliding the reception means downward when the container is incorrectly held in order to provoke the operation for releasing the container, the reception means being maintained in the bottom position at least until the container is expelled by the obstacle;

the reception means comprise a cam follower which is able to cooperate with a cam path which is fixed relative to the reception means and which drives the reception means by sliding to their bottom position in the releasing operation, the cam path including an upstream switching section which is mounted to move between a retracted position in which the reception means which are not oriented towards the cam path remain in the top position, and an active position in which the switching rail directs the cam follower to the cam path in order to selectively drive the reception means to their bottom position;

the switching rail is mounted to pivot relative to the cam path by one of its upstream or downstream ends between its retracted position and its active position;

the switching rail is mounted to slide relative to the cam path between its retracted position and its active position;

the switching rail is mounted to slide in a vertical direction;

the switching rail is mounted to slide in a horizontal direction perpendicular to the path of the reception means.

BRIEF DESCRIPTION OF THE DRAWINGS

Other characteristics and advantages will become apparent while reading the detailed description that follows, for an understanding of which the reader should refer to the appended drawings in which.

DETAILED DESCRIPTION OF THE PREFERRED EMBODIMENTS

In the description hereinbelow, a longitudinal, vertical and transversal orientation indicated by the trihedron L,V,T of FIG. 1 will be used in a non-limiting way.

Hereinafter, identical, analogous or similar elements will be designated by the same reference numbers.

Figure 1:
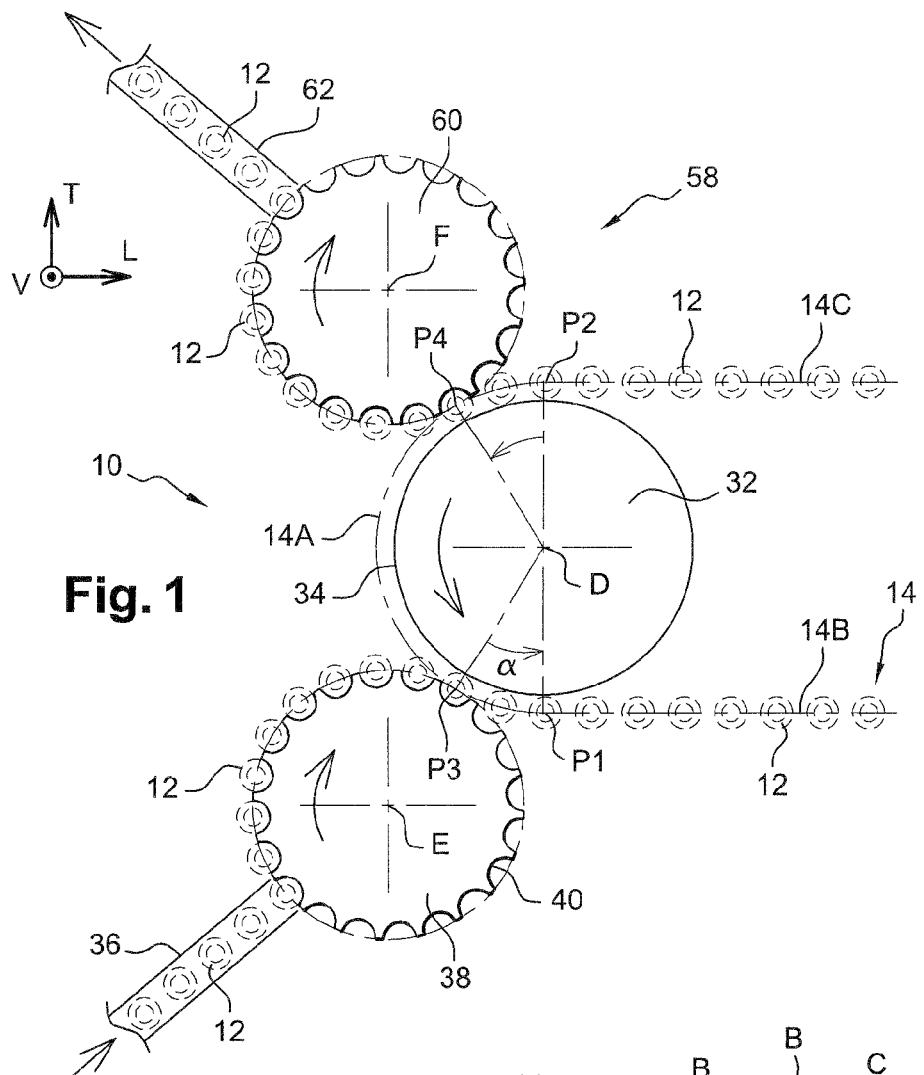
FIG. 1 is a plan view which represents a loading and unloading device which is produced according to the teachings of the invention.

FIG. 1 represents a device 10 for loading containers 12 onto a transporting element 14.

The containers 12 are in this case preforms which are made of a thermoplastic material, such as polyethylene terephthalate (PET), and which are intended to be transformed into containers, such as bottles, after a first heating operation to soften the constituent thermoplastic, then a second blow-molding or stretch blow-molding operation, to shape the preform 12 into a container.

Figure 2:
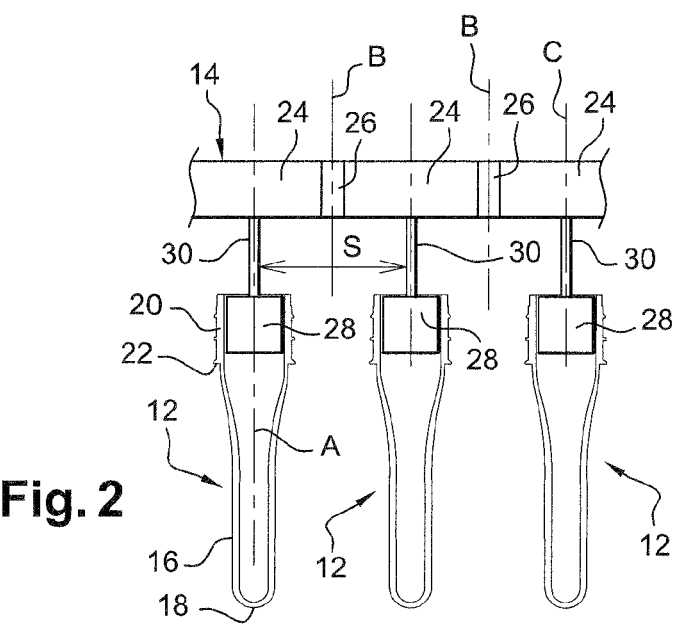
FIG. 2 is a larger-scale side view which represents preforms which are caught by mandrels carried by a transport chain.

In a known way, each preform 12 has the form of a test piece or test tube of vertical axis "A". As represented in FIG. 2, the tubular body 16 of the preform 12 is closed at its bottom end by a hemispherical bottom 18 whereas its top end has a neck 20 which forms the neck of the final container.

The junction between the tubular body 16 and the neck 20 is delimited by a collar 22 which extends horizontally projecting externally. The external cylindrical face 20 of the neck in this case comprises a screwthread which is intended to receive a threaded top (not represented) in order to seal the container.

The element 14 for transporting the preforms 12 is in this case a flexible element such as an endless transport chain which forms a closed loop extending in a horizontal plane. As represented in FIG. 2, the transport chain 14 comprises a plurality of links 24 which are hinged relative to each other by hinges 26 of vertical axis "B".

The transporting element 14 comprises a plurality of grasping members 28 which are in this case mandrels. Each mandrel 28 is carried by a link 24 of the transport chain 14. The mandrels 28 are spaced apart by a predetermined pitch "S" which in this case corresponds to the distance between the hinges 26 of a link 24.

Each mandrel 28 is more particularly carried by a rod 30, also called spinner, of vertical axis "C" which extends vertically downward from the middle of a bottom face of the link 24.

The bottom end of each rod 30 carries the mandrel 28 which comprises a plurality of jaws (not represented) which move radially relative to the axis "C" of the mandrel between a retracted position in which the mandrel 28 is able to be inserted inside the neck 20 of a preform 12, and an expanded position in which the jaws are able to exert a radial pressure against the internal cylindrical wall of the neck 20 of the preform 12 in order for the preform 12 to be secured by friction to the mandrel 28. The jaws are elastically returned to their expanded position.

Thus, in an operation for grasping the preform 12 by the mandrel 28, the mandrel 28 is inserted by force vertically inside the neck 20 of the preform 12 by vertical sliding relative to the mandrel 28 in relation to the preform 12, which provokes a retraction of the jaws against the elastic return force.

Figure 4:
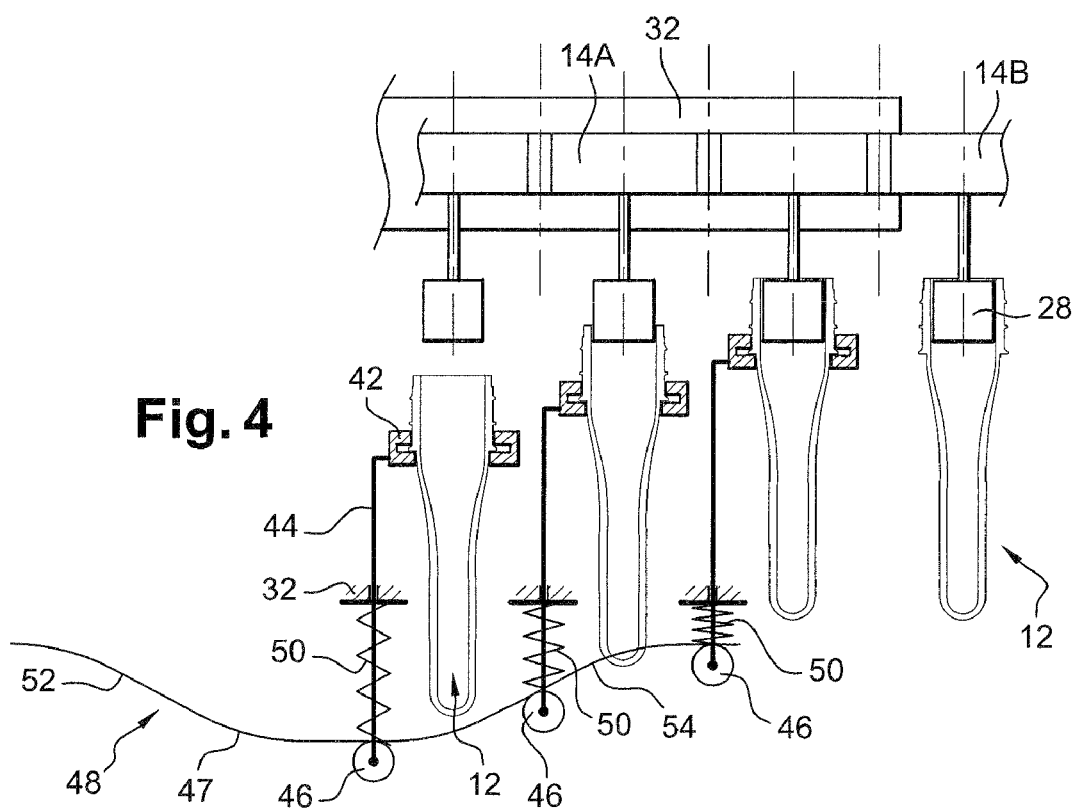
FIG. 4 is a diagrammatic side view which represents preforms during the grasping operation by the mandrels.
Figure 5:
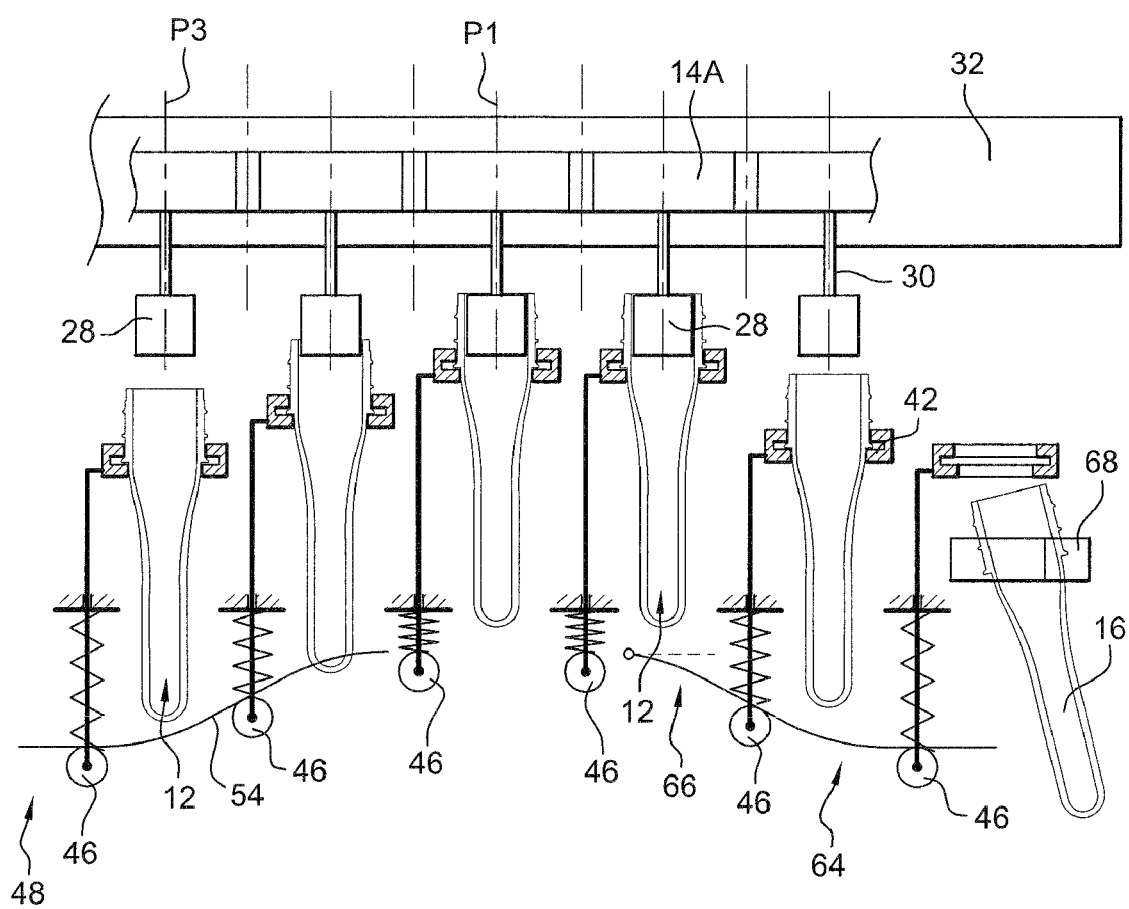
FIG. 5 is a view similar to that of FIG. 4 which represents the path of a preform which is incorrectly held by a mandrel.

In the embodiment represented in FIGS. 2, 4 and 5, the rod 30 is mounted to rotate about its axis "C" relative to the link 24 in order to be able to rotate the preform 12 on itself about the axis "C" when it is transported by the transport chain 14.

As represented in FIG. 1, the transport chain 14 is in this case driven rotationwise or at least guided rotationwise, by a drive wheel 32. The drive wheel 32 is mounted to rotate about its vertical central axis "D" and it is driven rotationwise in an anticlockwise direction with reference to FIG. 1.

A curved portion 14A of the transport chain 14 is wound around a peripheral rim portion 34 of the drive wheel 32. The curved portion 14A of the transport chain 14 here forms a semicircle.

The transport chain 14 also comprises a downstream rectilinear portion or downstream strand 14B which is positioned tangentially to the drive wheel 32 downstream of the curved portion 14A in the anticlockwise direction of rotation of the transport chain 14.

The transport chain 14 also comprises an upstream rectilinear portion or upstream strand 14C which is positioned tangentially to the drive wheel upstream of the curved portion 14A in the anticlockwise direction of rotation of the transport chain 14.

The transport chain 14 is able to transport in turn each preform 12 carried by a mandrel 28 from an input point "P1" where the preform 12 is taken by the mandrel 28, to an output point "P2" where the preform 12 is released from the mandrel 28, along a transport path, passing through at least one heating area (not represented).

In order for the predetermined pitch "S" between the mandrels 28 to be the same all along the transport chain 14, both on the rectilinear strands 14B, 14C and on the curved portion, the axis "C" of the mandrels and the axis "B" of the hinges follow a single common path along the chain.

The loading device 10 comprises means of supplying preforms 12 which are intended to route the preforms 12 one after the other to the transport chain 14 via means of distributing preforms 12 to the grasping members 28 which will be described in more detail hereinafter.

The supply means in this case comprise a guideway 36 and an input transfer wheel 38 which is mounted to rotate about its vertical central axis "E".

The input transfer wheel 38 comprises notches 40 for receiving necks 20 of the preforms 12 which are spaced apart from each other circumferentially by the predetermined pitch "S". These notches 40 are able to receive the necks 20 of the preforms 12 arriving via the guideway 36 and to support the preforms 12 using their projecting collar 22 which bears on the edge of the notches 40.

Thus, the guideway 36 successively guides each preform 12 to the input transfer wheel 38 so as to distribute each preform 12 in an associated notch 40.

The notches 40 of the input transfer wheel 38 are here positioned at a height less than that of the mandrels 28 of the transport chain 14.

As represented in FIG. 1, in planar projection, the input transfer wheel 38 is here positioned tangentially to the curved portion 14A of the transport chain 14 at a first point of intersection "P3".

The input transfer wheel 38 is driven rotationwise about its axis "E" in a clockwise direction with reference to FIG. 1. The rotation speed of the input drive wheel 38 is synchronized with the rotation speed of the transport chain 14 so that a grasping member 28 and a notch 40 of the input transfer wheel 38 present themselves in synchronism at the first point of intersection "P3" in line with one another.

According to the teachings of the invention, the loading device 10 also comprises means of distributing preforms 12 which are in particular intended to maintain the preforms 12 during the grasping operation by the mandrels 28.

Figure 3:
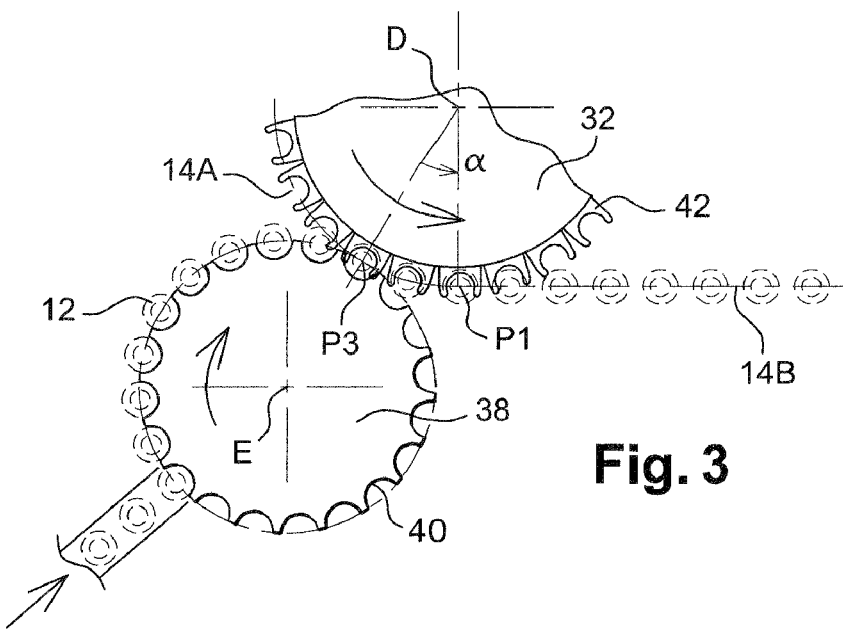
FIG. 3 is a view similar to that of FIG. 1 on a larger scale which represents an area for loading preforms onto the transport chain.

To this end, the drive wheel 32 comprises reception means 42 such as clamps as shown in FIG. 3. Here they are rigid clamps 42, the jaws of which, which are immobile relative to each other, delimit a recess of a shape complementing the shape of the neck 20 of each preform 12. Since the preforms 12 are made of an elastically deformable material, the neck 20 of the preform is elastically fitted reversibly between the jaws of the clamp 42.

According to a variant that is not represented of the invention, the clamps 42 have jaws which are articulated between a closed position and an open position, the jaws being returned elastically to their closed position.

According to a variant that is not represented of the invention, the clamps are carried by a plate of axis coaxial to the axis "D" of the drive wheel 32.

The clamps 42 are distributed over all the circumference of the drive wheel 32, roughly at the same height as the notches 40 of the input drive wheel 38. The clamps 42 are circumferentially separated from each other by the predetermined pitch "S" so that a clamp 42 is axially positioned under each mandrel 28 of the curved portion 14A of the transport chain 14.

Thus, in planar projection, the circular path of the clamps 42 is superimposed on the path of the mandrels 28 all along the curved portion 14A of the transport chain 14. In other words, in planar projection, the path of the mandrels 28 is the same as the path of the clamps 42 all along the curved portion 14A of the transport chain 14.

As represented in FIG. 4, each clamp 42 is intended to receive a preform 12 and to support this preform at least during the operation for grasping the preform 12 by the mandrel 28.

Each jaw of the clamp 42 comprises a groove which extends radially relative to the axis "A" of the preform in the internal wall of the jaw in order to receive the collar 22. The preform 12 is thus supported by the horizontal bottom wall of the groove. The horizontal top wall of the groove immobilizes the upward movements of the preform 12 relative to the clamp 42. Thus, when the collar 22 is received in the complementary groove of the clamp 42, the preform 12 is immobilized against vertical movement in both directions relative to the clamp 42.

Each clamp 42 passes the first point of intersection "P3" of the input transfer wheel 38 and of the transport chain 14, in synchronism with a notch 40 of the input transfer wheel 38. Since the clamps 42 are positioned substantially at the same height as the notch 40, the clamp 42 is able to catch under its collar 20 the preform 12 carried by the notch 40. The preform 12 is thus transferred from the input transfer wheel 38 to the drive wheel 32.

When the preform 12 is caught by the clamp 42, it occupies a so-called grasping position in which the axis "A" of the preform 12 is coaxial to the axis "C" of the mandrels 28, the mandrels thus being arranged facing the neck 20 of the preform 12.

The first point of intersection "P3" is positioned on the curved portion 14A of the chain 14, upstream of the input point "P1" which is positioned on the curved portion 14A of the chain 14 downstream of the first point of intersection "P3", for example at the downstream end of the curved portion 14A. Thus, the grasping operation advantageously lasts for the time it takes for the clamp 42 to travel an angular segment "P3-P1" of angle "a".

The path of the preform 12 carried by the clamp 42 and that of the mandrel 28 are superimposed along the angular segment "P3-P1" which forms, in planar projection, a first line of intersection between the path of the mandrels 28 and that of the clamps 42.

Thus, between the first point of intersection "P3" and the start point "P1", the preform 12 is maintained by the clamp 42 in its grasping position at right angles to the mandrel 28.

According to another aspect of the invention, the operation for grasping the preform 12 by the mandrel 28 requires a vertical sliding movement of the preform 12 into the grasping position relative to the mandrel 28.

According to the teachings of the invention, the clamps 42 are advantageously mounted to slide vertically relative to the drive wheel 32 between a bottom transfer position in which the clamp 42 is positioned at the same height as the notches 40 of the input transfer wheel 38 and a top loading position in which the neck 20 of the preform 12 carried by the clamp 42 is at the same height as the mandrels 28 so that the mandrel 28 is fitted into the neck 20.

As represented in FIG. 4, the vertical sliding of each clamp 42 is here controlled by a cam system. Thus, each clamp has a cam follower which comprises a control rod 44. A roller 46 is mounted to rotate at a free bottom end of the control rod 44 of each clamp 42.

The roller 46 is intended to cooperate with a cam path 47 which is here carried by the bottom surface of a grasping rail 48. The grasping rail 48 is fixed relative to the drive wheel 32, that is, the grasping rail 48 is not driven rotationwise by the drive wheel 32.

Furthermore, each clamp 42 is elastically returned to its top loading position by a return spring 50, so that it is not necessary to prolong the rail when the clamp 42 is in the top loading position.

The cam path 47 comprises a first upstream slope 52 which is intended to control the lowering of the clamp 42 to its bottom transfer position. The cam path 47 also comprises a second downstream slope 54 which is intended to control the raising of the clamp 42 to its top loading position.

The second upstream slope 54 here extends over at least a portion of the line of intersection corresponding to the angular segment of angle "a", so that the grasping operation can be performed for a long enough time to ensure a reliable fitting of the mandrel 28 inside the neck 20 of the preform 12.

According to yet another aspect of the invention represented in FIG. 5, the loading device 10 comprises means for ejecting a preform 12 when it is not correctly caught by the mandrel 28, for example when the preform 12 is likely to fall on its path along the transport chain 14.

In this case, the start point "P1" of the preforms is arranged upstream of the downstream end of the curved portion 14A of the transport chain 14, so that the clamps 42 are able to temporarily support the preforms 12 after they have been taken by the mandrel 28 to the end of the curved portion 14A of the transport chain 14.

To this end, the loading device 10 comprises a sensor (not represented) for detecting the preforms 12 that are incorrectly fitted. The sensor is arranged so as to detect a fitting fault when the clamp 42 is in the top loading position, that is, when the preform 12 is caught by the mandrel 28 and its neck 20 is still supported by the clamp 42.

The ejection means also comprise a second ejection rail 64 which comprises a cam path and, more specifically, a downward slope so as to maintain the clamp 42 in the bottom transfer position against the force exerted by the return spring 50 when the preform 12 is incorrectly fitted.

In order to selectively engage the clamps 42 carrying a preform 12 that is incorrectly fitted to the ejection rail 64, the device 10 comprises a retractable switching rail 66 which is mounted to move between a retracted position in which it is not inserted in the path of the roller 46 so that the clamp 42 remains in the top grasping position, and an active position in which the retractable switching rail 66 is inserted into the path of the roller 46 so as to direct the roller 46 under the ejection rail 64 in order to lower the clamp 42 to its bottom transfer position.

When the retractable switching rail 66 is in the active position, the clamp 42 is returned to its bottom transfer position by the ejection rail 64 while separating the neck 20 from the mandrel 28.

The retractable switching rail 66 is in this case a portion of rail which is mounted to pivot relative to its upstream end.

According to a variant of the invention, the retractable switching rail 66 is a portion of rail that is mounted to slide vertically between a retracted top position and an active bottom position.

According to yet another variant of the invention, the retractable switching rail 66 is a portion of rail which is mounted to slide radially relative to the axis "D" of the drive wheel 32, between a retracted external lateral position and an active internal insertion position.

When the preform 12 that is incorrectly fitted or incorrectly held is once again in its bottom transfer position, it is released from the clamp 42 to leave the device 10 and the installation 14. The preform 12 is, for example, released from the clamp 42 when it is no longer located under the transport chain 14, after the paths of the clamps 42 and of the mandrels 28 have diverged.

To this end, the device comprises an obstacle such as a first arm 68 which is inserted in the path of the body 16 of the preform 12 when the latter has been switched to its bottom transfer position by the retractable switching rail 66. The arm 68 is here a plate which makes it possible to release the preform 12 from the grip of the clamp 42 by provoking the separation of the preform 12 from the clamp 42.

As represented in FIG. 1, the installation also comprises an unloading device 58 which is similar to the loading device 10. Thus, the unloading device 58 comprises an output transfer wheel 60 and an output guideway 62.

The output transfer wheel 60 is positioned at the same height as the input transfer wheel 38, and it comprises notches 40 identical to those of the input transfer wheel 38, and it is mounted to rotate in a clockwise direction about an axis "F" tangentially to the drive wheel 32 at a second point of intersection "P4".

The clamps 42 of the drive wheel 32 are able to catch the preforms 12 carried by the mandrels 28 at an arrival point "P2" which is here positioned at the upstream end of the curved portion 14A of the transport chain 14.

The rotation speed of the output transfer wheel 60 is also synchronized with the rotation speed of the drive wheel 32 so that a notch 40 of the output transfer wheel 60 passes in synchronism with a clamp 42 of the drive wheel 32 at the second point of intersection "P4" which is positioned downstream of the arrival point "P2".

In planar projection, the path of the clamps 42 and the path of the mandrels 28 are superimposed on a second line of intersection "P2-P4" which extends between the arrival point "P2" and the second point of intersection "P4".

The second point of intersection "P4" is more particularly positioned upstream of the first point of intersection "P3" relative to the direction of rotation of the drive wheel 32.

Thus, between the moment at which the preform 12 is caught at the point "P3" by a clamp 42 and the moment at which the preform is transferred to the output transfer wheel 60 at the second point of intersection "P4", the preform 12 is maintained by the clamp 42 in line with the associated mandrel 28.

In a releasing operation which extends along the second line of intersection "P2-P4", the preform 12 is released from the grip of the mandrel 28 by a progressive downward vertical sliding movement of the clamp 42 which begins substantially at the arrival point "P2" and which ends roughly at the second point of intersection "P4".

The unloading device 58 comprises a second arm (not represented) which is able to release the preform from the grip of the clamp 42.

Advantageously, the same clamps 42 are therefore used successively to maintain the preforms in the grasping position in the grasping operation, then in the releasing operation.

In the operation of such a heating installation, the preforms 12 are routed one behind the other by the guideway 36 to each notch 40 of the input transfer wheel 38. Then, the input transfer wheel transports each preform 12 to the first point of intersection "P3" with the transporting element 14.

A clamp 42 which is driven by the grasping rail to its bottom transfer position then automatically catches the preform 12 so as to maintain the preform 12 vertically under an associated mandrel 28 in the grasping position.

The preform 12 is then supported by the clamp 42, and it is joined rotationwise to the drive wheel 32.

The clamp 42 is then returned to its top grasping position by the return spring 50. The return of the clamp 42 to its top grasping position is guided progressively by the rolling of the roller 46 under the downstream slope 54 of the grasping rail 48. Thus, the grasping operation extends over the angular segment "P3-P1" of angle "a" all along the path of the preform 12 and the path of the mandrel 28 are superimposed, the preform 12 thus being maintained strictly vertically in line with the mandrel 28 by the clamp 42.

In the grasping operation, the clamp 42 progressively raises the preform 12 to the mandrel 28 from its bottom position at the first point of intersection "P3" until the mandrel 28 is fitted in the neck 20 of the preform 12 when the preform 12 reaches the input point "P1" of the path of the mandrel 28.

When the path of the mandrel 28 and the path of the clamp 42 diverge, the preform 12 is automatically released from the clamp 42, the divergent movement of the preform 12 forcing the separation of the neck 20 from the clamp 42.

Then, the preform 12 is transported along its path to its output point "P2" which is positioned at the upstream and of the curved portion 14A of the transport chain 14. At this point, the preform 12 is caught by a clamp 42 in the top grasping position.

In planar projection, the clamp 42 has a path "P2-P4" which is common and tangential to the path of the mandrel 28 so that the clamp 42 is in line with the mandrel 28 at least from the output point "P2" at which the preform 12 is caught by the clamp 42, to the second point of intersection "P4" at which the preform 12 is transferred to the output transfer wheel 60.

Then, the clamp 42 is driven to its bottom position by a releasing rail (not represented) similar to the grasping rail 48. The clamp 42 bears on the collar 22 so as to separate the mandrel 28 from the neck 20 of the preform 12. The preform 12 is thus released from the grip of the mandrel 28.

The preform 12 is lowered to a transfer position in which the collar 22 of the preform 12 is positioned at the same height as the notches 40 of the output transfer wheel 60.

The preform 12 arrives in the transfer position at the second point of intersection "P4" in synchronism with a notch 40 of the output transfer wheel 60 so that the preform 12 is transferred to the notch 40 of the transfer wheel 60.

To this end, the preform 12 is released from the clamp 42 at the second point of intersection "P4" by means of the second arm or of an automatic control system.

The invention claimed is:

1. A device (10) for loading containers (12) with a vertical axis comprising an upper neck (20), and in particular preforms made of thermoplastic material, onto a transporting element (14) which comprises at least one individual member (28) for grasping a container (12) by a neck (20) of said container and which is configured to transport the preform (12) along a horizontal transport path, the grasping member

(28) being configured to catch or release the neck (20) of the preform (12) by vertically sliding the preform (12) into a grasping position relative to the grasping member (28) in an operation for grasping or releasing the preform,
the loading device (10) comprising means (42, 68) for selectively ejecting the container (12) from the transporting element (14), when the container (12) is incorrectly held by the individual grasping member (28) after the grasping operation, in a releasing operation,
wherein the means for ejecting the container (12) comprise reception means (42) for receiving the container (12), the reception means configured to catch the container (12) prior to the releasing operation, and the reception means being mounted to move horizontally so that the path of the reception means (42) is vertically superimposed and synchronized with the path of the grasping member (28).

2. The device (10) as claimed in claim 1, wherein the ejection means comprise means (68) for controlling the expulsion of the container (12) from the reception means (42) after the releasing operation.

3. The device (10) as claimed in claim 2, wherein the reception means (42) comprise a clamp (42) configured to catch the neck (20) of the container (12) by reversible elastic fitting of the preform (12) in the clamp (42).

4. The device (10) as claimed in claim 3, further comprising:
an obstacle (68) which is positioned on the path of the lower body (16) of the container (12) carried by the clamp (42) downstream of the operation for releasing the container (12), so that the container (12) is stopped by the obstacle (68) while the clamp (42) continues to move, causing the preform (12) to be separated from the clamp (42).

5. The device (10) as claimed in claim 4,
wherein the reception means (42) are mounted to slide vertically relative to the grasping member (28) between a top position in which the container (12) carried by the clamp (42) is held by the grasping member (28), and a bottom position in which the container (12) is released from the grasping member (28), and
wherein the device further comprises means for selectively sliding the reception means (42) downward when the container (12) is incorrectly held in order to provoke the operation for releasing the container (12), the reception means (42) being maintained in the bottom position at least until the container (12) is expelled by the means (68) for controlling the expulsion of the container (12).

6. The device (10) as claimed in claim 3,
wherein the reception means (42) are mounted to slide vertically relative to the grasping member (28) between a top position in which the container (12) carried by the clamp (42) is held by the grasping member (28), and a bottom position in which the container (12) is released from the grasping member (28), and
wherein the device further comprises means for selectively sliding the reception means (42) downward when the container (12) is incorrectly held in order to provoke the operation for releasing the container (12), the reception means (42) being maintained in the bottom position at least until the container (12) is expelled by the means (68) for controlling the expulsion of the container (12).

7. The device (10) as claimed in claim 2,
wherein the reception means (42) are mounted to slide vertically relative to the grasping member (28) between a top position in which the container (12) carried by the reception means (42) is held by the grasping member (28), and a bottom position in which the container (12) is released from the grasping member (28), and
wherein in that it the device further comprises means for selectively sliding the reception means (42) downward when the container (12) is incorrectly held in order to provoke the operation for releasing the container (12), the reception means (42) being maintained in the bottom position at least until the container (12) is expelled by the means (68) for controlling the expulsion of the container (12).

8. The device (10) as claimed in claim 7,
wherein the reception means (42) comprise a cam follower (44, 46) configured to cooperate with a cam path (64) which is fixed relative to the reception means (42) and which drives the reception means (42) by sliding to their bottom position in the releasing operation, and
wherein the cam path (64) includes an upstream switching rail (66) which is mounted to move between a retracted position in which the reception means (42) which are not oriented towards the cam path (64) remain in the top position, and an active position in which the switching rail (66) directs the cam follower (44, 46) to the cam path (64) in order to selectively drive the reception means (42) to their bottom position.

9. The device (10) as claimed in claim 8, wherein the switching rail (66) is mounted to pivot relative to the cam path (64) by one of an upstream or downstream end of said rail (66) between the retracted position and the active position.

10. The device (10) as claimed in claim 8, wherein the switching rail (66) is mounted to slide relative to the cam path (64) between the retracted position and the active position.

11. The device (10) as claimed in claim 10, wherein the switching rail (66) is mounted to slide in a vertical direction.

12. The device (10) as claimed in claim 10, wherein the switching rail (66) is mounted to slide in a horizontal direction perpendicular to the path of the reception means (42).

13. A loading device for loading objects onto a transporting element, the object having an upper neck extending along a vertical axis, and the transporting element having at least one individual grasping member for grasping an object by the neck and transporting the object along a horizontal transport path, the grasping member being configured to perform a grasping operation to catch the neck by vertically sliding the object into a grasping position relative to the grasping member, the loading device comprising:
an ejecting device configured to selectively eject the object from the transporting element in a releasing operation in a condition when the object is incorrectly held by the individual grasping member after the grasping operation,
the ejecting device comprising a reception device configured to receive the object, the reception device configured to catch the object prior to the releasing operation, and the reception device being mounted to move horizontally so that a path of the reception device is vertically superimposed and synchronized with the transport path of the grasping member.

14. The device as claimed in claim 13, wherein the ejecting device comprises a component configured to cause an expulsion of the object from the reception device after the releasing operation.

15. The device as claimed in claim 14, wherein the reception device comprises a plurality of clamps, each clamp configured to catch the neck of the object by a reversible elastic fitting of an object in the clamp.

16. The device as claimed in claim 15, wherein the ejecting device comprises an obstacle positioned on a path of a lower body of the object carried by the clamp, downstream of the releasing operation, so that the object is stopped by the obstacle while the clamp moves in synchronization with the transport path, causing the object to be separated from the clamp.

17. The device as claimed in claim 15,
wherein the clamps of the reception device each are mounted to slide vertically relative to the grasping member between i) a top position in which the object carried by the reception device is held by the grasping member and ii) a bottom position in which the object is released from the grasping member, and wherein the device further comprises a component configured to selectively slide a clamp downward when the object is incorrectly held in order to provoke the releasing operation, the clamp being maintained in the bottom position at least until the object is expelled by the expulsion component.

18. The device as claimed in claim 17,
wherein each clamp of the reception device comprises a cam follower configured to cooperate with a cam path which is fixed relative to the reception device and configured to drive the clamps to slide to the bottom position in the releasing operation, and wherein the cam path includes an upstream switching rail which is mounted to move between i) a retracted position in which clamps of the reception device not oriented towards the cam path remain in the top position, and ii) an active position in which the switching rail directs the cam follower to the cam path in order to selectively drive a selected clamp of the reception device to the bottom position.

19. The device as claimed in claim 17, wherein the ejecting device comprises an obstacle positioned on a path of a lower body of the object carried by the clamp, downstream of the releasing operation, so that the object is stopped by the obstacle while the clamp moves in synchronization with the transport path, causing the object to be separated from the clamp.

* * * * *